J. N. OGLE.
MOTION PICTURE APPARATUS.
APPLICATION FILED JUNE 5, 1920.

1,411,668.

Patented Apr. 4, 1922.

Witness
Edwin L. Bradford

Inventor
John N. Ogle
By Greene & Greene
Attorneys

UNITED STATES PATENT OFFICE.

JOHN N. OGLE, OF ADAMSTOWN, MARYLAND, ASSIGNOR TO C. FRANCIS JENKINS, OF WASHINGTON, DISTRICT OF COLUMBIA.

MOTION-PICTURE APPARATUS.

1,411,668.  Specification of Letters Patent.  Patented Apr. 4, 1922.

Application filed June 5, 1920. Serial No. 386,695.

*To all whom it may concern:*

Be it known that I, JOHN N. OGLE, a citizen of the United States, and resident of Adamstown, in the county of Frederick and State of Maryland, have invented certain new and useful Improvements in Motion-Picture Apparatus, of which the following is a specification, reference being had therein to the accompanying drawing.

Usually portable motion picture projecting machines are, so far as I know, now provided with a lamp-house enclosed within the carrying case. Practically this arrangement has disadvantages. The size of the picture is limited by the amount of light obtainable from low voltage lamps necessarily used because at least one reel of film is carried in the case and high power lamps, such as are indispensable for adequately illuminating large picture screens, generate so much heat as to endanger the casing as well as all film therein. Even were it possible to keep the heat at a safe degree, the portable casing, unless made unduly or inconveniently large, cannot contain a powerful light of usual character.

To obviate these and other difficulties, I provide a carrying case and a coacting lamphouse to be located outside the carrying case, when in use, in fixed relation to the film exposing devices in the casing, the lamphouse being so arranged that it is kept at low temperature and furnishes to the interior of the casing only such heat as is carried by the projecting beam and given up within the casing.

For convenience, I prefer to arrange the lamphouse for swinging into the casing when not in use.

In the accompanying drawings.

Figure 1:
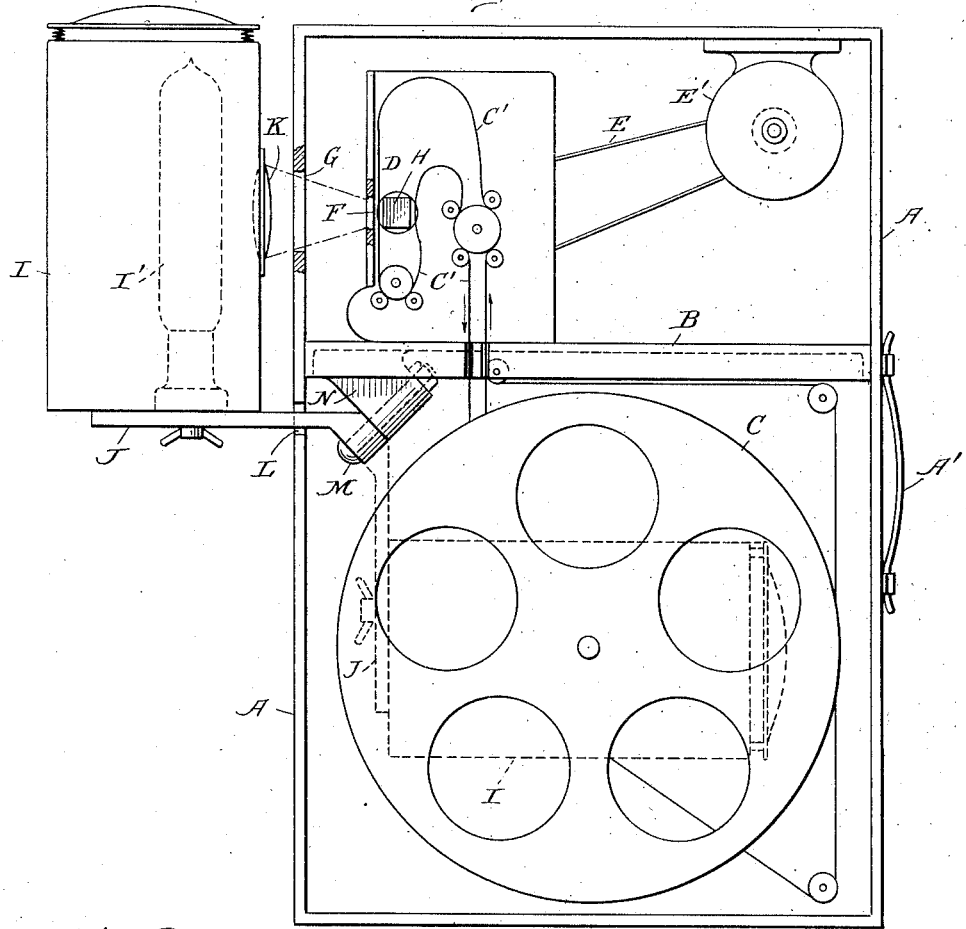
Figure 1 shows in side elevation a carrying casing and a high-power lamp connected therewith, the side of the casing being removed to show diagrammatically a film handling apparatus without novelty herein claimed.
Figure 2:
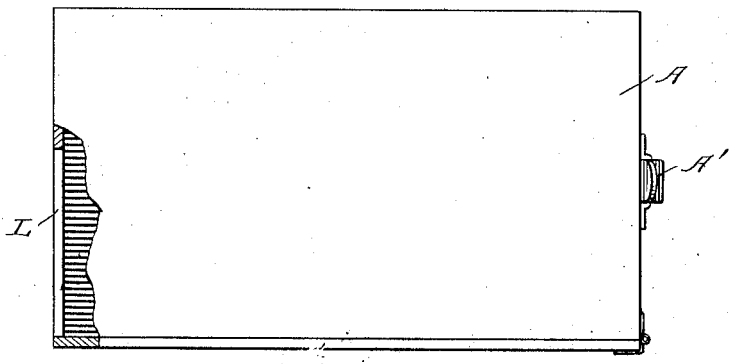
Figure 2 is a partial plan view of the same devices, a portion of the removed hinged side or door of the casing being added.

In these figures, A represents a carrying casing or box having a handle A' and divided into two compartments by a strong horizontal partition B. Reels at C in the lower compartment deliver film C' to the exposure mechanism, at D, driven by a belt E from a small motor E', the film being exposed at F where light entering the casing through an opening G passes through the film and is deflected to a screen, not shown, by a prism or mirror H. A lamphouse I containing a strong lamp I' is rigidly and adjustably secured to an arm J projecting from the casing in such position that the axis of the condensing lens K passes centrally through the exposure opening at F. The lamphouse is preferably at some little distance from the wall of the casing, so that heat is constantly eliminated by air on all sides. The vertical framing adjustment of the light is not shown. The arm J projects out of the casing through a slot L and within the casing is pivoted to swing on an axis M inclined at an angle of 45° and carried by a member N, which may be a part of the partition B or other rigid portion of the casing or frame structure upon which the devices D are mounted.

Obviously, when the casing wall O is opened or removed and the arm J released, the reels may be removed and the lamphouse when swung 180° will lie in the reel space, as shown in dotted lines at P.

The arm J and its slot L may be of such form that the closing of the wall or door O holds the arm against all swinging movement. This pivoting is convenient, but the use of any other means for holding the lamphouse in the casing and for properly securing it in exterior working position would give many of the advantages of the preferred construction shown.

What I claim is:

1. The combination with a casing having an internal space for a removable film reel, of film exposing devices within the casing, a lamphouse adapted to be placed within the film reel space, and means for at will supporting the lamphouse in the film reel space or outside the casing at an adjustable distance therefrom and in position to send a beam to said devices.

2. The combination with a casing and film exposing devices mounted within the same, of a film reel normally removably supported within the casing, a distinct normally external lamphouse supported from the casing and arranged to move when the reel is removed from normal beam-delivering position to a position within the casing primarily occupied by the reel.

3. The combination with a manually portable casing containing film exposing mechanism, openable at one side, and provided with a suitable slot, of a rigid arm pivoted at its end to swing in said slot until it projects from the casing, and a lamphouse secured to the free end portion of the arm.

4. The combination with a casing containing film exposing devices and having a suitable slot in its wall of a rigid arm adjustably supporting a lamphouse and arranged to swing in said slot, about an oblique axis, between a limit where the lamphouse is within the casing and a limit where the lamphouse is without the casing in position to send a light beam to said devices.

5. The combination with a casing to be carried in the hand, having a suitable slot in its wall, and provided with a space for a supply of film within the casing, of film exposing mechanism mounted in the casing at one side of said space, a rigid arm bearing a lamphouse and pivoted to swing in said slot and carry the lamphouse back and forth between said space and an external position where it may direct its light beam to said exposing mechanism.

6. The combination with a casing enclosing substantially no space not indispensable for containing projecting mechanism and the necessary film reel, of a lamphouse adapted in form and arrangement to be supported, when not in use, by the casing and in its reel space.

In testimony whereof I hereunto affix my signature.

JOHN N. OGLE.